United States Patent [19]

Hurlock

[11] Patent Number: 6,025,426

[45] Date of Patent: *Feb. 15, 2000

[54] PROCESS FOR PREPARING HYDROPHILIC DISPERSION POLYMERS FOR TREATING WASTEWATER

[75] Inventor: John R. Hurlock, Hickory Hills, Ill.

[73] Assignee: Nalco Chemical Company, Naperville, Ill.

[ * ] Notice: This patent is subject to a terminal disclaimer.

[21] Appl. No.: 08/573,924

[22] Filed: Dec. 18, 1995

Related U.S. Application Data

[63] Continuation-in-part of application No. 08/515,770, Aug. 16, 1995, Pat. No. 5,938,937.

[51] Int. Cl.⁷ ...................................................... C08F 2/16
[52] U.S. Cl. ......................... 524/458; 524/457; 524/460; 524/461; 524/707; 524/708; 524/761; 524/767; 524/787; 524/796
[58] Field of Search ..................................... 524/461, 460, 524/458, 707, 708, 761, 767, 787, 796

[56] References Cited

U.S. PATENT DOCUMENTS

| | | | |
|---|---|---|---|
| 3,647,769 | 3/1972 | Bufton et al. | 524/566 |
| 4,391,932 | 5/1990 | Tai | 523/337 |
| 4,396,513 | 8/1983 | Haldeman | 210/734 |
| 4,929,655 | 5/1990 | Takeda et al. | 524/458 |
| 5,006,590 | 4/1991 | Takeda et al. | 524/458 |
| 5,137,641 | 8/1992 | Bhattacharyya et al. | 210/734 |
| 5,330,650 | 7/1994 | Byrne et al. | 210/708 |
| 5,435,922 | 7/1995 | Ramesh et al. | 210/734 |
| 5,451,326 | 9/1995 | Carlson et al. | 210/734 |
| 5,587,415 | 12/1996 | Takeda et al. | 524/458 |

*Primary Examiner*—Judy M. Reddick
*Attorney, Agent, or Firm*—Michael B. Martin; Thomas M. Breininger

[57] ABSTRACT

Hydrophilic cationic copolymers of acrylamide are prepared as dispersions in a salt media. These polymers have high molecular weights and are readily activated by diluting in water. These polymers are useful flocculants for such applications as sludge dewatering, raw water clarification aids, emulsion breakers and waste water clarification aids.

10 Claims, No Drawings

PROCESS FOR PREPARING HYDROPHILIC DISPERSION POLYMERS FOR TREATING WASTEWATER

1. REFERENCE TO RELATED PATENT

The present application is a continuation-in-part of application Ser. No. 08/515,770, filed Aug. 16, 1995, now U.S. Pat. No. 5,938,937, by John R. Hurlock and John W. Sparapany, entitled "Hydrophilic Dispersion Polymers for Treating Wastewater", the disclosure of which is incorporated herein by reference.

BACKGROUND OF THE INVENTION

2. FIELD OF THE INVENTION

The invention relates to a process for manufacturing hydrophilic dispersion polymers.

3. DESCRIPTION OF THE PRIOR ART

Water soluble copolymers of acrylamide and cationic monomers such as dimethylaminoethylacrylate methyl chloride quaternary salts are well known in the literature. U.S. Pat. No. 3,647,769 teaches the formation of a copolymer of acrylamide and acrylonitirile followed by reaction with amines. Polymers of this type have high molecular weights, high viscosities in water and are hydrophilic. However, to ship such aqueous polymers in commerce, very dilute solutions would be required which is impractical. Preparation of inverse latex polymers or water-in-oil emulsions is described in U.S. Pat. No. 4,391,932. The inverse latex product is an oil continuous phase with water soluble polymer particles dispersed within the oil by emulsifiers. Activation of these polymers can require sophisticated equipment and often the polymer particles are not completely solubilized.

Water dispersions polymers described as water soluble co- and ter-polymers containing a hydrophobic moiety are described in U.S. Pat. Nos. 5,006,590 and 4,929,655, assigned to Kyoritsu Yuki Co., Ltd., Tokyo, Japan. Disclosures of these patents are incorporated herein. These polymers are prepared in a water continuous phase containing salts and in some cases low molecular weight cationic polymeric dispersants. The polymers are diluted in water for activation. In these polymers the hydrophobic moiety prevent the polymer from fully solubilizing and reaching full activity. According to U.S. Pat. Nos. 5,006,590 and 4,929,655 the polymer dispersion is prepared from a water-soluble monomer mixture containing at least 5 mole percent of a cationic monomer represented by the general formula (I):

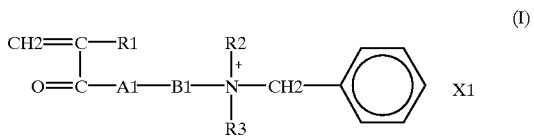

(I)

where R1 is H or CH3; R2 and R3 are each an alkyl group having 1 or 2 carbons atoms; A1 is an oxygen atom or NH; B1 is an alkyl group and X1 is a counter anion such as chloride or bromide.

SUMMARY OF THE INVENTION

This invention relates to the unexpected formation of dispersions of hydrophilic cationic copolymers of acrylamide in a salt media. The polymers of the invention are cationic high molecular weight hydrophilic dispersions of polymer in a water continuous phase. Diluting the polymer product into water results in solubilizing the dispersion polymers thereby activating the polymers for use. These polymers have been found to be particularly effective for removing solids and oils from waste waters.

DESCRIPTION OF THE PREFERRED EMBODIMENTS

The polymers of the invention were found to form stable dispersions and readily solubilize upon dilution in water. Because there are no hydrophobic moieties on the polymer, the sludge conditioning activities were significantly better than the dispersion polymers prepared with hydrophobic moieties. The cationic copolymers of this invention comprise copolymers of acrylamide and dimethylaminoethylacrylate methyl chloride quaternary salt (DMAEA.MCQ) and dimethylaminoethylmethacrylate methyl chloride quaternary salt (DMAEM.MCQ).

The term "quaternary salt" as used herein contemplates the use of any conventional quaternizing agent, as for example, methyl chloride, methyl bromide, methyl iodide and dimethyl sulfate.

The polymers of this invention are prepared as hydrophilic copolymers of acrylamide and dimethylaminoethylacrylate methyl chloride quaternary salt in a salt media containing a low molecular weight cationic dispersant polymer. Preferably, the chain transfer agents include sodium formate, isopropanol and 2-mercaptoethanol, and the like.

The polymers of this invention are useful as retention aids in the manufacture of paper, as dewatering aids for municipal and industrial waste materials and as raw water clarification aids.

The hydrophilic dispersion polymer of the invention is prepared by polymerization of acrylamide with DMAEA.MCQ or DMAEM.MCQ in a water/salt media. The polyvalent anionic salt in the aqueous solution is suitably a sulfate, phosphate or mixture thereof. Preferable salts include ammonium sulfate, sodium sulfate, ammonium hydrogenphosphate and the like. In the present invention these salts may be each used as an aqueous solution thereof having a concentration of 15 percent or greater.

A dispersant polymer is present in the aqueous salt solution where the polymerization of the monomers occurs. The dispersant polymer is a water-soluble cationic polymer which is soluble in the above described salt media. The dispersant polymer is used in an amount of from 1 to 10 percent by weight based on the total weight of monomers. The dispersant polymer is composed of preferably 20 mole percent or more of cationic units such as DMAEA.MCQ, DMAEM.MCQ and diallyldimethylammonium chloride (DADMAC). The remainder of the dispersant mole percent composition is preferably acrylamide or methacrylamide. Molecular weight of the dispersant is preferably between 10,000 and 10,000,000. A multifunctional alcohol may also be present during the polymerization. Such alcohols include glycerin and polyethyleneglycol. The formation of the dispersion particles are smoothly carried out in the presence of these alcohols. These alcohols are also believed to control the resulting molecular weight of the polymer. Further control of the molecular weight can be accomplished by using chain transfer agents such as sodium formate and isopropanol.

For the polymerizations, a suitable water-soluble radical-forming agent, or initiator, can be used, but preferably water-soluble azo compounds such as 2,2'-azobis (2amidinopropane)hydrochloride and 2,2'-azobis(N,N'-dimethyleneisobutylamine)hydrochloride are used.

Persulfate inhibitors and redox initiators like APB/SBS and other conventional initiators as are familiar to those skilled in the art may also be used.

The polymerization process can be carried out as a batch process or in steps. In a batch process, all of the reactive monomers are reacted together, whereas in a step or semi-batch process, a portion of the reactive monomer is with held from the main reaction and added over time to affect the compositional drift of the copolymer and the formation of the dispersion particles. Typically, DMAEM.MCQ chemistry must be polymerized in a semi-batch process to afford a more random copolymer. A more random copolymer of cationic and nonionic monomers performs better in the desired application of the polymer. Seed polymer can also be used to aid in the formation of the dispersion particles. The seed polymer is a water soluble dispersion polymer which is insoluble in the salt media. The composition of the seed polymer need not be similar to the composition being formed.

ACTIVATION OF THE DISPERSION POLYMERS

Activation of the polymers is required prior to introducing the polymers into the water stream to be treated. Activation requires dilution of the polymers in water and mixing with sufficient energy to dissolve and disentangle the polymers to a sufficient degree so that the polymers perform in the water to be treated. Activation for bench testing was accomplished by diluting the polymer products to 1 percent product solutions and mixing with a cage paddle attached on a cone drive mixer set at 800 rpm. The volume of the activated polymer solution prepared for the bench testing was 200 ml and mixing was performed for 30 minutes to ensure complete activation. Inverse latex polymers were tested for comparison purposes and were activated in the same manner. Polymers with active concentration greater than 0.2 percent after activation were further diluted so as to contain 0.2 percent actives for testing.

The following examples are presented to describe the preferred embodiments and utilities of the invention and are not meant to limit the invention unless otherwise stated in the claims.

EXAMPLE 1

To a two-liter resin reactor equipped with strirrer, temperature controller, and water cooled condenser, was added 303.50 grams of a 48.1% solution of acrylamide (2.0538 moles), 3.41 grams of a 80.6% solution of DMAEA.MCQ (0.01419 moles), 250 grams of ammonium sulfate, 217.03 grams of deionized water, 27 grams of glycerol, 56.25 grams of a 16% solution of a polyDADMAC (IV=1.5 dl/gm), 18 grams of a 20% solution of polyDMAEA.MCQ (IV=2.0 dl/gm), and 0.3 grams of EDTA. The mixture was heated to 48 C. and 0.50 grams of a 4% solution of 2,2'Azobis(2 amidinopropane)dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 101.17 grams (0.6846 moles) of 48.1% acrylamide, 3.24 grams (0.01348 moles) of an 80% solution of DMAEA.MCQ, 9 grams of glycerol and 0.1 gram of EDTA was pumped into the reactor using a syringe pump. To the resulting polymer dispersion was added 0.50 grams of a 4% solution of 2,2'Azobis(2 amidinopropane)dihydrochloride. The dispersion was then further reacted for 2.5 hours at a temperature of 48 to 55 C. The resulting polymer dispersion had a Brookfield viscosity of 3700 cps. To the above dispersion was added 10 grams of 99% acetic acid and 20 grams of sodium sulfate. The resulting dispersion (Compound A) had a Brookfield viscosity of 1250 cps and contained 20% of a 99/1 copolymer of acrylamide and DMAEA.MCQ with an intrinsic viscosity of 12.5 dl/gm in 0.125 molar NaNO3.

EXAMPLE 2

To a two-liter resin reactor equipped with strirrer, temperature controller, and water cooled condenser, was added 287.59 grams of a 47.1% solution of acrylamide (1.9461 moles), 7.24 grams of a 80.6% solution of DMAEA.MCQ (0.0301 moles), 250 grams of ammonium sulfate, 225.59 grams of deionized water, 27 grams of glycerol, 56.25 grams of a 16% solution of a polyDADMAC (IV=1.5 dl/gm), 18 grams of a 20% solution of polyDMAEA.MCQ (IV=2.0 dl/gm), and 0.3 grams of EDTA. The mixture was heated to 48 C. and 0.50 grams of a 4% solution of 2,2'Azobis(2 amidinopropane)dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 95.86 grams (0.6487 moles) of 48.1% acrylamide, 12.7 grams (0.0502 moles) of an 80% solution of DMAEA.MCQ, 9 grams of glycerol and 0.1 gram of EDTA was pumped into the reactor using a syringe pump. To the resulting polymer dispersion was added 0.50 grams of a 4% solution of 2,2'Azobis(2 amidinopropane)dihydrochloride. The dispersion was then further reacted for 2.5 hours at a temperature of 48 C. to 55 C. The resulting polymer dispersion had a Brookfield viscosity of 5600 cps. To the above dispersion was added 10 grams of 99% acetic acid and 20 grams of sodium sulfate. The resulting dispersion (Compound B) had a Brookfield viscosity of 1525 cps and contained 20% of a 97/3 copolymer of acrylamide and DMAEA.MCQ with an intrinsic viscosity of 12.1 dl/gm in 0.125 molar NaNO3.

EXAMPLE 3

To a two-liter resin reactor equipped with strirrer, temperature controller, and water cooled condenser, was added 281.68 grams of a 48.1% solution of acrylamide (1.9061 moles), 12.07 grams of a 80.6% solution of DMAEA.MCQ (0.05023 moles), 250 grams of ammonium sulfate, 225.10 grams of deionized water, 27 grams of glycerol, 33.75 grams of a 16% solution of a polyDADMAC (IV=1.5 dl/gm), 36 grams of a 20% solution of polyDMAEA.MCQ (IV=2.0 dl/gm), and 0.3 grams of EDTA. The mixture was heated to 48 C. and 0.50 grams of a 4% solution of 2,2'Azobis(2 amidinopropane)dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 93.89 grams (0.6354 moles) of 48.1% acrylamide, 20.11 grams (0.08368 moles) of an 80.6% solution of DMAEA.MCQ, 9 grams of glycerol and 0.1 gram of EDTA was pumped into the reactor using a syringe pump. To the resulting polymer dispersion was added 0.50 grams of a 4% solution of 2,2'Azobis(2 amidinopropane)dihydrochloride. The dispersion was then further reacted for 2.5 hours at a temperature of 48 C. to 55 C. The resulting polymer dispersion had a Brookfield viscosity of 10000 cps. To the above dispersion was added 10 grams of 99% acetic acid and 20 grams of sodium sulfate. The resulting dispersion (Compound C) had a Brookfield viscosity of 2825 cps and contained 20% of a 95/5 copolymer of acrylamide and DMAEA.MCQ with an intrinsic viscosity of 11.4 dl/gm in 0.125 molar NaNO3.

EXAMPLE 4

To a two-liter resin reactor equipped with strirrer, temperature controller, and water cooled condenser, was added 239.38 grams of a 48.1% solution of acrylamide (1.6199 moles), 21.63 grams of a 80.6% solution of DMAEA.MCQ (0.09001 moles), 260 grams of ammonium sulfate, 258.01 grams of deionized water, 18 grams of glycerol, 33.75 grams of a 16% solution of a polyDADMAC (IV=1.5 dl/gm), 36 grams of a 20% solution of polyDMAEA.MCQ (IV=2.0 dl/gm), and 0.3 grams of EDTA. The mixture was heated to 48 C. and 0.50 grams of a 4% solution of 2,2'Azobis(2 amidinopropane)dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 79.79 grams (0.5399 moles) of 48.1% acrylamide, 36.04 grams (0.1500 moles) of an 80.6% solution of DMAEA.MCQ, 6 grams of glycerol and 0.1 gram of EDTA was pumped into the reactor using a syringe pump. To the resulting polymer dispersion was added 0.50 grams of a 4% solution of 2,2'Azobis(2 amidinopropane)dihydrochloride. The dispersion was then further reacted for 2.5 hours at a temperature of 48 C. to 55 C. The resulting polymer dispersion had a Brookfield viscosity of 7600 cps. To the above dispersion was added 10 grams of 99% acetic acid and 20 grams of sodium sulfate. The resulting dispersion (Compound D) had a Brookfield viscosity of 2100 cps and contained 20% of a 95/5 copolymer of acrylamide and DMAEA.MCQ with an intrinsic viscosity of 15.5 dl/gm in 0.125 molar NaNO3.

Examples of Low Charge DMAEA.MCQ Copolymers

| Compound | Mole % Quat | (NH4)2SO4/ Na2SO4 | Glyc % | Visc. Cps. | RSV | IV |
|---|---|---|---|---|---|---|
| A | 1% MCQ | 25%/2% | 3.6 | 250 | 14.3 | 12.5 |
| B | 3% MCQ | 25%/2% | 3.6 | 1500 | 14.6 | 12.1 |
| C | 5% MCQ | 25%/2% | 3.6 | 2825 | 14.8 | 11.4 |
| D | 10% MCQ | 26%/2% | 2.4 | 2100 | 19.6 | 15.5 |

EXAMPLE 5

To a two-liter resin reactor equipped with strirrer, temperature controller, and water cooled condenser, was added 132.18 grams of a 48.1% solution of acrylamide (0.8945 moles), 14.32 grams of a 74.9% solution of DMAEM.MCQ (0.0516 moles), 180 grams of ammonium sulfate, 50 grams of sodium sulfate, 280.84 grams of deionized water, 13.2 grams of glycerol, 33.75 grams of a 16% solution of a polyDADMAC (IV=1.5 dl/gm), 36 grams of a 20% solution of polyDMAEA.MCQ (IV=2.0 dl/gm), and 0.2 grams of EDTA. The mixture was heated to 48 C. and 1.50 grams of a 4% solution of 2,2'Azobis(2 amidinopropane) dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 108.15 grams of 48.1% acrylamide, 98.36 grams (0.3547 moles) of an 74.9% solution of DMAEM.MCQ, 10.8 grams of glycerol and 0.2 grams of EDTA was pumped into the reactor using a syringe pump. To the resulting polymer dispersion was added 0.50 grams of a 4% solution of 2,2'Azobis(2 amidinopropane) dihydrochloride. The dispersion was then further reacted for 2.5 hours at a temperature of 48 C. to 55 C. The resulting polymer dispersion had a Brookfield viscosity of 3000 cps. To the above dispersion was added 10 grams of 99% acetic acid and 30 grams of ammonium sulfate. The resulting dispersion (Compound E) had a Brookfield viscosity of 1400 cps and contained 20% of a 80/20 copolymer of acrylamide and DMAEM.MCQ with an intrinsic viscosity of 19.6 dl/gm in 0.125 molar NaNO3.

EXAMPLE 6

To a two-liter resin reactor equipped with strirrer, temperature controller, and water cooled condenser, was added 91.29 grams of a 48.1% solution of acrylamide (0.6178 moles), 25.12 grams of a 74.9% solution of DMAEM.MCQ (0.0905 moles), 180 grams of ammonium sulfate, 70 grams of sodium sulfate, 316 grams of deionized water, 13.2 grams of glycerol, 33.75 grams of a 16% solution of a polyDADMAC (IV=1.5 dl/gm), 36 grams of a 20% solution of polyDMAEA.MCQ (IV=2.0 dl/gm), and 0.2 grams of EDTA. The mixture was heated to 48 C. and 2.00 grams of a 4% solution of 2,2'Azobis(2 amidinopropane) dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 74.64 grams (0.5051 moles) of 48.1% acrylamide, 135.25 grams (0.4877 moles) of an 74.9% solution of DMAEM.MCQ, 10.8 grams of glycerol and 0.2 grams of EDTA was pumped into the reactor using a syringe pump. To the resulting polymer dispersion was added 1.00 grams of a 4% solution of 2,2'Azobis(2 amidinopropane)dihydrochloride. The dispersion was then further reacted for 2.5 hours at a temperature of 48 C. to 55 C. To the above dispersion was added 10 grams of 99% adipic acid. The resulting polymer dispersion (Compound F) had a Brookfield viscosity of 600 cps and contained 20% of an 66/34 copolymer of acrylamide and DMAEM.MCQ with an intrinsic viscosity of 15.1 dl/gm in 0.125 molar NaNO3.

| Compound | MMCQ/Acam | (NH4)2SO4/ Na2SO4 | Viscosity | RSV | IV |
|---|---|---|---|---|---|
| E | 20/80 | 21%/5% | 1400 cps | 21.9 | 19.6 |
| F | 34/66 | 18%/7% | 600 cps | 19.7 | 15.1 |

EXAMPLE 7

To a two-liter resin reactor equipped with strirrer, temperature controller, and water cooled condenser, was added 136.03 grams of a 48.1% solution of acrylamide (0.9205 moles), 37.12 grams of a 80.6% solution of DMAEA.MCQ (0.1545 moles), 190 grams of ammonium sulfate, 50 grams of sodium sulfate, 267.99 grams of deionized water, 13.2 grams of glycerol, 33.75 grams of a 16% solution of a polyDADMAC (IV=1.5 dl/gm), 45 grams of a 20% solution of polyDMAEA.MCQ (IV=2.0 dl/gm), and 0.2 grams of EDTA. The mixture was heated to 48 C. and 0.50 grams of a 4% solution of 2,2'Azobis(2 amidinopropane) dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 111.29 grams of 48.1% acrylamide, 63.47 grams (0.2641 moles) of an 80.6% solution of DMAEA.MCQ, 10.8 grams of glycerol and 0.2 grams of EDTA was pumped into the reactor using a syringe pump. To the resulting polymer dispersion was added 0.50 grams of a 4% solution of 2,2'Azobis(2 amidinopropane) dihydrochloride. The dispersion was then further reacted for 2.5 hours at a temperature of 48 C. to 55 C. The resulting polymer dispersion had a Brookfield viscosity of 2160 cps. To the above dispersion was added 10 grams of 99% adipic acid and 30 grams of ammonium sulfate. The resulting dispersion (Compound G) had a Brookfield viscosity of 1325 cps and contained 20% of an 80/20 copolymer of acrylamide and DMAEA.MCQ with an intrinsic viscosity of 13.7 dl/gm in 0.125 molar NaNO3.

EXAMPLE 8

To a two-liter resin reactor equipped with strirrer, temperature controller, and water cooled condenser, was added 93.10 grams of a 49.2% solution of acrylamide (0.6444 moles), 56.94 grams of a 75.0% solution of DMAEA.MCQ (0.2205 moles), 170 grams of ammonium sulfate, 70 grams of sodium sulfate, 297.32 grams of deionized water, 13.2 grams of glycerol, 33.75 grams of a 16% solution of a polyDADMAC (IV=1.5 dl/gm), 45 grams of a 20% solution of polyDMAEA.MCQ (IV=2.0 dl/gm), and 0.2 grams of EDTA. The mixture was heated to 48 C. and 0.75 grams of a 4% solution of 2,2'Azobis(2 amidinopropane) dihydrochloride was added. The resulting solution was sparged with 1000 cc/min. of Nitrogen. After 15 minutes, polymerization began and the solution became viscous. Over the next 4 hours the temperature was maintained at 48 C. and a solution containing 76.11 grams (0.5268 moles) of 49.2% acrylamide, 98.47 grams (0.3813 moles) of an 75.0% solution of DMAEA.MCQ, 10.8 grams of glycerol and 0.2 grams of EDTA was pumped into the reactor using a syringe pump. To the resulting polymer dispersion was added 0.25 grams of a 4% solution of 2,2'Azobis(2 amidinopropane) dihydrochloride. The dispersion was then further reacted for 2.5 hours at a temperature of 48 C. to 55 C. The resulting polymer dispersion had a Brookfield viscosity of 4500 cps. To the above dispersion was added 10 grams of 99% adipic acid and 24 grams of deionized water. The resulting dispersion (Compound H) had a Brookfield viscosity of 7500 cps and contained 20% of an 66/34 copolymer of acrylamide and DMAEA.MCQ with an intrinsic viscosity of 19.9 dl/gm in 0.125 molar NaNO3.

| Compound | MMCQ/Acam | (NH4)2/Na2SO4 | Viscosity CPS | RSV | IV |
|---|---|---|---|---|---|
| G | 20/80 | 19%/5% | 1325 cps | 19.3 | 13.7 |
| H | 34/66 | 17%/7% | 3650 cps | 21.9 | 19.9 |

EXAMPLE 9

To a two-liter resin reactor equipped with strirrer, temperature controller, and water cooled condenser, was added 25.66 grams of a 49.2% solution of acrylamide (0.1769 moles), 161.29 grams of a 62.0% solution of DADMAC (0.6192 moles), 210 grams of ammonium sulfate, 30 grams of sodium sulfate, 258.48 grams of deionized water, 12 grams of glycerol, 33.75 grams of a 16% solution of a polyDADMAC (IV=1.5 dl/gm), 45 grams of a 20% solution of polyDMAEA.MCQ (IV=2.0 dl/gm), and 0.2 grams of EDTA. The mixture was heated to 48 C. and 5.00 grams of a 4% solution of 2,2'Azobis(2 amidinopropane) dihydrochloride was added. The resulting solution was sparged with 1000 cc/min. of Nitrogen. After 15 minutes, polymerization began and the solution became viscous. Over the next 4 hours the temperature was maintained at 50 C. and a solution containing 178.42 grams of 49.0% acrylamide, (1.230 moles) and 0.2 grams of EDTA was pumped into the reactor using a syringe pump. To the resulting polymer dispersion had a Brookfield viscosity of 1325 cps. The dispersion was then further reacted for 2.5 hours at a temperature of 55 C. The resulting polymer dispersion had a Brookfield viscosity of 1125 cps. To the above dispersion was added 10 grams of 99% adipic acid, 10 grams of ammonium sulfate and 12.5 grams of a 60% aqueous solution of ammonium thiosulfate. The resulting dispersion had a Brookfield viscosity of 580 cps and contained 20% of an 50 weight percent copolymer of acrylamide and DADMAC with an intrinsic viscosity of 4.96 dl/gm in 1.0 molar NaNO3.

EXAMPLE 10

To a two-liter resin reactor equipped with strirrer, temperature controller, and water cooled condenser, was added 25.66 grams of a 49.0% solution of acrylamide (0.1769 moles), 161.29 grams of a 62.0% solution of DADMAC (0.6192 moles), 210 grams of ammonium sulfate, 30 grams of sodium sulfate, 252.48 grams of deionized water, 12 grams of glycerol, 33.75 grams of a 16% solution of a polyDADMAC (IV=1.5 dl/gm), 45 grams of a 20% solution of polyDMAEA.MCQ (IV=2.0 dl/gm), and 0.2 grams of EDTA. The mixture was heated to 48 C. and 2.50 grams of a 4% solution of 2,2'Azobis(2 amidinopropane) dihydrochloride 2.50 grams of a 4% solution of 2,2'Azobis (N,N'-dimethylene isobutryramidine)dihydrochloride was added. The resulting solution was sparged with 1000 cc/min. of Nitrogen. After 15 minutes, polymeriztion began and the solution became viscous. Over the next 4 hours the temperature was maintained at 50 C. and a solution containing 178.42 grams of 49.0% acrylamide, (1.230 moles) and 0.2 grams of EDTA was pumped into the reactor using a syringe pump. The resulting polymer dispersion had a Brookfield viscosity of 2100 cps. The dispersion was then further reacted for 2.5 hours at a temperature of 55 C. The resulting polymer dispersion had a Brookfield viscosity of 1250 cps. To the above dispersion was added 10 grams of 99% adipic acid, 10 grams of ammonium sulfate and 12.5 grams of a 60% aqueous solution of ammonium thiosulfate. The resulting dispersion had a Brookfield viscosity of 687.5 cps and contained 20% of an 50 weight percent copolymer of acrylamide and DADMAC with an intrinsic viscosity of 6.40 dl/gm in 1.0 molar NaNO3.

EXAMPLE 11

To a two-liter resin reactor equipped with strirrer, temperature controller, and water cooled condenser, was added 25.66 grams of a 49.0% solution of acrylamide (0.1769 moles), 161.29 grams of a 62.0% solution of DADMAC (0.6192 moles), 200 grams of ammonium sulfate, 40 grams of sodium sulfate, 303.60 grams of deionized water, 0.63 grams of sodium formate, 45 grams of a 20% solution of polyDMAEA.MCQ (IV=2.0 dl/gm), and 0.2 grams of EDTA. The mixture was heated to 48 C. and 2.50 grams of a 4% solution of 2,2'Azobis(2 amidinopropane) dihydrochloride 2.50 grams of a 4% solution of 2,2'Azobis (N,N'-dimethylene isobutryramidine)dihydrochloride was added. The resulting solution was sparged with 1000 cc/min. of Nitrogen. After 15 minutes, polymeriztion began and the solution became viscous. Over the next 4 hours the temperature was maintained at 50 C. and a solution containing 178.42 grams of 49.0% acrylamide, (1.230 moles) and 0.2 grams of EDTA was pumped into the reactor using a syringe pump. The resulting polymer dispersion had a Brookfield viscosity of 3400 cps. The dispersion was then further reacted for 2.5 hours at a temperature of 55 C. The resulting polymer dispersion had a Brookfield viscosity of 1400 cps. To the above dispersion was added 10 grams of 99% adipic acid, 10 grams of ammonium sulfate and 12.5 grams of a 60% aqueous solution of ammonium thiosulfate. The resulting dispersion had a Brookfield viscosity of 775 cps and contained 20% of an 50 weight percent copolymer of acrylamide and DADMAC with an intrinsic viscosity of 5.33 dl/gm in 1.0 molar NaNO3.

EXAMPLE 12

To a two-liter resin reactor equipped with strirrer, temperature controller, and water cooled condenser, was added 25.66 grams of a 49.0% solution of acrylamide (0.1769 moles), 161.29 grams of a 62.0% solution of DADMAC (0.6192 moles), 200 grams of ammonium sulfate, 40 grams of sodium sulfate, 303.85 grams of deionized water, 0.38 grams of sodium formate, 45 grams of a 20% solution of polyDMAEA.MCQ (IV=2.0 dl/gm), and 0.2 grams of EDTA. The mixture was heated to 48 C. and 2.50 grams of a 4% solution of 2,2'Azobis(2 amidinopropane) dihydrochloride 2.50 grams of a 4% solution of 2,2'Azobis (N,N'-dimethylene isobutryramidine)dihydrochloride was added. The resulting solution was sparged with 1000 cc/min. of Nitrogen. After 15 minutes, polymeriztion began and the solution became viscous. Over the next 4 hours the temperature was maintained at 50 C. and a solution containing 178.42 grams of 49.0% acrylamide, (1.230 moles) and 0.2 grams of EDTA was pumped into the reactor using a syringe pump. The resulting polymer dispersion had a Brookfield viscosity of 4200 cps. The dispersion was then further reacted for 2.5 hours at a temperature of 55 C. The resulting polymer dispersion had a Brookfield viscosity of 3300 cps. To the above dispersion was added 10 grams of 99% adipic acid, 10 grams of ammonium sulfate and 12.5 grams of a 60% aqueous solution of ammonium thiosulfate. The resulting dispersion (Compound J) had a Brookfield viscosity of 1312.5 cps and contained 20% of an 50 weight percent copolymer of acrylamide and DADMAC with an intrinsic viscosity of 6.32 dl/gm in 1.0 molar $NaNO_3$.

EXAMPLE 13

To a two-liter resin reactor equipped with strirrer, temperature controller, and water cooled condenser, was added 49.27 grams of a 49.0% solution of acrylamide (0.3397 moles), 65.02 grams of a 62.0% solution of DADMAC (0.2496 moles), 190 grams of ammonium sulfate, 50 grams of sodium sulfate, 272.94 grams of deionized water, 1.0 grams of sodium formate, 45 grams of a 20% solution of polyDMAEA.MCQ (IV=2.0 dl/gm), and 0.1 grams of EDTA. The mixture was heated to 32 C. and 2.50 grams of a 4% solution of 2,2'Azobis(2 amidinopropane) dihydrochloride and 7.5 grams of a 4% solution of 2,2'Azobis(N,N'-dimethylene isobutryramidine) dihydrochloride was added. The resulting solution was sparged with 1000 cc/min. of Nitrogen. After 15 minutes, polymeriztion began and the solution became viscous. Over the next 4 hours the temperature was maintained at 32 C. and a solution containing 276.62 grams of 49.0% acrylamide, (1.907 moles) and 0.3 grams of EDTA was pumped into the reactor using a syringe pump. The resulting polymer dispersion had a Brookfield viscosity of 1400 cps. The dispersion was then further reacted for 2.5 hours at a temperature of 55 C. The resulting polymer dispersion had a Brookfield viscosity of 1800 cps. To the above dispersion was added 10 grams of 99% adipic acid, 20 grams of ammonium sulfate and 12.5 grams of a 60% aqueous solution of ammonium thiosulfate. The resulting dispersion (Compound K) had a Brookfield viscosity of 950 cps and contained 20% of a 10 mole percent copolymer of DADMAC with acrylamide with an intrinsic viscosity of 7.45 dl/gm in 1.0 molar NaNO3.

EXAMPLE 14

To a two-liter resin reactor equipped with strirrer, temperature controller, and water cooled condenser, was added 12.49 grams of a 49.0% solution of acrylamide (0.0861 moles), 224.00 grams of a 62.0% solution of DADMAC (0.8600 moles), 210 grams of ammonium sulfate, 30 grams of sodium sulfate, 325.31 grams of deionized water, 0.13 grams of sodium formate, 45 grams of a 20% solution of polyDMAEA.MCQ (IV=2.0 dl/gm), and 0.2 grams of EDTA. The mixture was heated to 48 C. and 0.10 grams of 2,2'Azobis(2 amidinopropane)dihydrochloride and 0.20 grams of 2,2'Azobis(N,N'-dimethylene isobutryramidine) dihydrochloride was added. The resulting solution was sparged with 1000 cc/min. of Nitrogen. After 15 minutes, polymerization began and the solution became viscous. Over the next 4 hours the temperature was maintained at 50 C. and a solution containing 112.5 grams of 49.0% acrylamide, (0.7738 moles) and 0.2 grams of EDTA was pumped into the reactor using a syringe pump. The resulting polymer dispersion had a Brookfield viscosity of 2880 cps. The dispersion was then further reacted for 2.5 hours at a temperature of 55 C. The resulting polymer dispersion had a Brookfield viscosity of 1150 cps. To the above dispersion was added 10 grams of 99% adipic acid, 12.5 grams of a 60% aqueous solution of ammonium thiosulfate. The resulting dispersion (Compound L) had a Brookfield viscosity of 845 cps and contained 20% of a 50 mole percent copolymer of acrylamide and DADMAC with acrylamide with an intrinsic viscosity of 4.80 dl/gm in 1.0 molar NaNO3.

EXAMPLE 15

To a two-liter resin reactor equipped with strirrer, temperature controller, and water cooled condenser, was added 57.11 grams of a 49.0% solution of acrylamide (0.3937 moles), 34.46 grams of a 62.0% solution of DADMAC (0.1323 moles), 200 grams of ammonium sulfate, 70 grams of sodium sulfate, 244.36 grams of deionized water, 1.06 grams of sodium formate, 45 grams of a 20% solution of polyDMAEA.MCQ (IV=2.0 dl/gm), and 0.1 grams of EDTA. The mixture was heated to 32 C. and 0.10 grams of 2,2'Azobis(2 amidinopropane)dihydrochloride and 0.30 grams of 2,2'Azobis(N,N'-dimethylene isobutryramidine) dihydrochloride was added. The resulting solution was sparged with 1000 cc/min. of Nitrogen. After 15 minutes, polymeriztion began and the solution became viscous. Over the next 4 hours the temperature was maintained at 32 C. and a solution containing 307.46 grams of 49.0% acrylamide, (2.120 moles) and 0.3 grams of EDTA was pumped into the reactor using a syringe pump. The resulting polymer dispersion had a Brookfield viscosity of 3500 cps. The dispersion was then further reacted for 2.5 hours at a temperature of 55 C. The resulting polymer dispersion had a Brookfield viscosity of 3600 cps. To the above dispersion was added 10 grams of 99% adipic acid, 30 grams of ammonium sulfate and 12.5 grams of a 60% aqueous solution of ammonium thiosulfate. The resulting dispersion (Compound M) had a Brookfield viscosity of 3850 cps and contained 20% of a 50 mole percent copolymer of DADMAC with acrylamide with an intrinsic viscosity of 7.05 dl/gm in 1.0 molar NaNO3.

| Example | Product | Charge | DADMAC/ACAM | RSV | IV |
|---------|---------|--------|-------------|------|------|
| J | 4104-023 | 30.4% | 50/50 W/W | 6.32 | 7.10 |
| K | 4104-042 | 10% | 10/90 M/M | 7.45 | 7.33 |
| L | 4104-048 | 50% | 50/50 M/M | 4.80 | 4.60 |
| M | 4104-059 | 5% | 5/95 M/M | 7.05 | 6.45 |

Changes can be made in the composition, operation and arrangement of the method of the present invention described herein without departing from the concept and scope of the invention as defined in the following claims:

I claim:

1. A process for preparing a water soluble hydrophilic polymer dispersion comprising polymerizing monomers consisting of acrylamide and a methyl chloride quaternary compound selected from the group consisting of dimethylaminoethyl acrylate methyl chloride quaternary ammonium salts, diallyldimethyl ammonium chloride and dimethylaminoethylmethacrylate methyl chloride quaternary ammonium salts in an aqueous salt solution in the presence of a dispersant polymer, a chain transfer agent and a free radical initiator.

2. The process of claim 1 wherein a portion of the acrylamide and a portion of the methyl chloride quaternary compound are reacted together and the remainder of the acrylamide and the methyl chloride quaternary compound are added over time.

3. The process of claim 1 wherein said aqueous salt solution is formed from an anionic salt selected from the group consisting of ammonium sulfate, sodium sulfate, ammonium hydrogen phosphate and mixtures thereof.

4. The process of claim 1 wherein said aqueous salt solution has a concentration of greater than 15 weight percent based on the weight of said salt.

5. The process of claim 1, wherein the dispersant polymer is soluble in water, the aqueous salt solution, and the polymer dispersion.

6. The process of claim 1 wherein the dispersant polymer is selected from the group consisting of poly(acrylamide/dimethylaminoethyl acrylate methyl chloride quaternary ammonium salt), poly(acrylamide/dimethylaminoethyl methacrylate methyl chloride quaternary ammonium salt), poly(acrylamide/diallyldimethyl ammonium chloride), poly(dimethylaninoethyl acrylate methyl chloride quaternary ammonium salt), and poly(dimethylaminoethyl methacrylate methyl chloride quaternary ammonium salt).

7. The process of claim 1 wherein the initiator is selected from the group consisting of 2,2'-azobis(2-amidinopropane) hydrochloride, 2,2'-azobis(N,N'-dimethyleneisobutylamine) hydrochloride and ammonium persulfate/sodium bisulfite.

8. The process of claim 1 further comprising the step of providing a seed polymer before the addition of said monomers, wherein said seed polymer is a water-soluble dispersion polymer which is insoluble in said aqueous salt solution.

9. The process of claim 1 wherein the chain transfer agent is selected from the group consisting of sodium formate and isopropanol.

10. The process of claim 1 further comprising adding to the dispersant polymer, the chain transfer agent and the free radical initiator a polyol selected from the group consisting of glycerin and polyethylene glycol.

* * * * *